Feb. 27, 1968  G. ARCHER ET AL  3,370,564
ARTICULATED SHIP AND COUPLING MEANS THEREFOR HAVING
MEANS TO ESTABLISH STRUCTURAL INTEGRITY
Filed Oct. 21, 1965                                                                 2 Sheets-Sheet 1
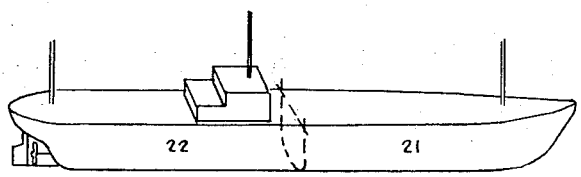
FIG. 1a
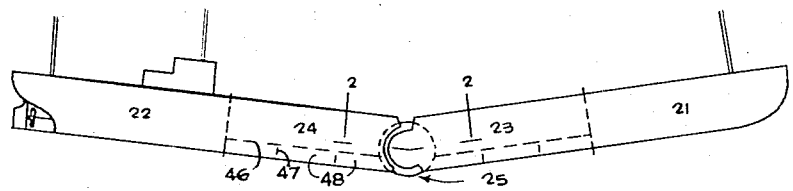
FIG. 1b
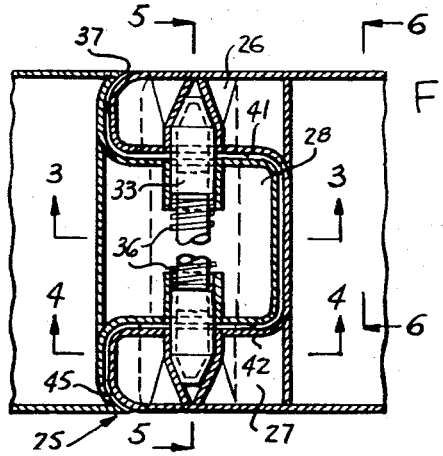
FIG. 2
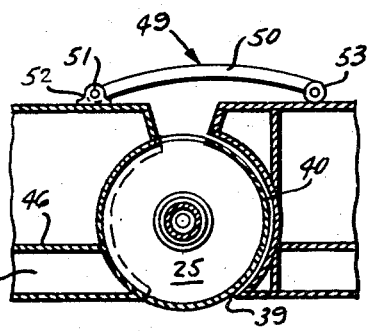
FIG. 3
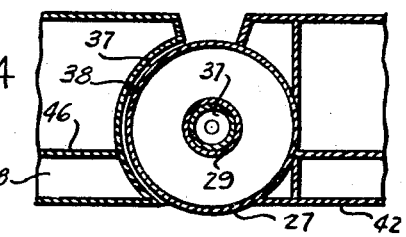
FIG. 4
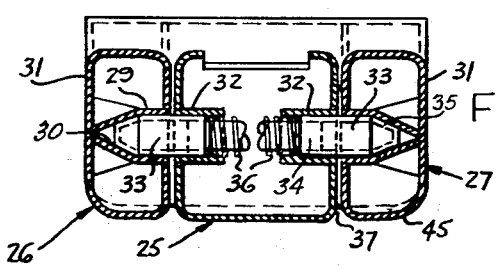
FIG. 5
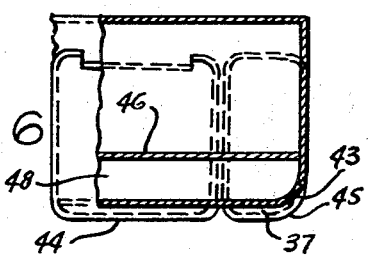
FIG. 6
FIG. 7
INVENTORS
GARDNER ARCHER
KARL E. SCHOENHERR
BY  *Chandlee Pidgeon*
AGENT Feb. 27, 1968  G. ARCHER ET AL  3,370,564
ARTICULATED SHIP AND COUPLING MEANS THEREFOR HAVING
MEANS TO ESTABLISH STRUCTURAL INTEGRITY
Filed Oct. 21, 1965  2 Sheets-Sheet 2

INVENTORS.
GARDNER ARCHER
KARL E. SCHOENHERR

BY Chandler Pidgeon
AGENT.

United States Patent Office 3,370,564
Patented Feb. 27, 1968

3,370,564
ARTICULATED SHIP AND COUPLING MEANS
THEREFOR HAVING MEANS TO ESTABLISH
STRUCTURAL INTEGRITY
Gardner Archer and Karl Ernest Schoenherr, Washington, D.C., assignors to Missouri Research, Inc., Washington, D.C.
Continuation-in-part of application Ser. No. 356,482, Apr. 1, 1964. This application Oct. 21, 1965, Ser. No. 499,628
13 Claims. (Cl. 114—77)

ABSTRACT OF THE DISCLOSURE

This disclosure relates to an articulated ship, and more particularly to a hinge coupling for segments of such ship. In the simplest form, a pair of hinge members are located at the port and starboard sides of one segment of the ship, extending substantially from deck to keel lines. Intermediate these members, a hinge member is formed on the bow of the adjacent segment and fits between the former members. Hinge pin receiving sockets are formed in the hinge members and have frustoconical outer ends and cylindrical intermediate portions. A retractible hinge pin member having conical ends and cylindrical intermediate portions is engaged in the socket members, and is urged into contact with the conical socket members. The segments are provided with false bottoms to form bottom holds which are subdivided for variable loading to permit changing the draft of one segment relative to that of another to reduce strains on the hinge and to facilitate coupling of the segments. A further improvement comprises stress and strain measuring means located within a hinge coupling whereby the measurement of forces acting on the coupling in three planes, normal to each other, may be continuously monitored.

This application is a continuation-in-part of our copending application Ser. No. 356,482, filed Apr. 1, 1964, now abandoned.

This invention relates to an articulated ship and coupling means therefor having means to establish structural integrity; permitting movement about a horizontal double pivot axis, or hinge, permitting, within limits, the segments to assume vertical angular relationship with respect to one another. The invention relates to alignment and balancing of segments for eased connecting and disconnecting and for the maintenance of the same during ship operation by means of a false bottom and ballast tanks and flexure monitoring and coupling means. Further, this invention contemplates a modification of the coupling means for the simultaneous monitoring of its structure for the forces and moments imposed by the seaway upon said coupling means. Such monitoring means may be employed in the prototype merchant ship or in an experimental scale model.

Insurable merchant ships, of course, know but one configuration, and that consists of: the monolithic . . . the empiric hull. That singular fact has doubtless been determined by many considerations. One factor of significance however exists in the officially maintained practical bar to any potential alternative within the dictates of the anachronistic empiric practice used for defining cargo ship insurability. A typical, "Rules For Building and Classing Steel Vessels" is issued annually by a ship classification society. A corporation monopoly, elevated to a quasi-government status which acts as agent for marine insurers and so defines strictly; steel and, proportional length, beam, and depth of a ship of the standard empiric hull configuration. Such rules were arrived at by a continuing use of the medieval practice of finding the rules from the destructive experience of previously built ships. An existing merchant ship is insurable therefore only as its design and structure accords with rules fixed in arbitrary backward look at past destructive experiences. "Destructive Testing," is the empiric method test employed today for ship hull insurance, as it was in medieval ages when a farmer who wanting to sell his eggs was required to break the eggs open to prove or establish they were good eggs. Despite harsh U.S. industrial needs for, and a superior capability in modern technology, the status quo investors are easily persuaded, for the presumption lies and is carried to an argument that since no other ship is insured; then the empiric ship is "proved" the "best ship configuration." Maritime history doubtless knows more than one case where empiricists were guilty in fact in their non-allowance of, "an unproved ship" to enter their contest wherein profits are paid for the more efficient performance. While empiric practice plus vicious aestheticism do affect industrial progress; among modern researchers with knowledge of work and findings in the field of articulated ships the previous easy "status quo presumption," does not obtain support. The history of western civilization does shown that the sure and certain nature of modern technology is to displace empiric vehicles and practice with non-destructive testing, rational faith, etc. This invention relates to such modern technology.

The *Connector*, an 1858 articulated ship was experimentally operated with unchallenged success during its English registry of nine years; but it was denied insurance. With ship insurance practice of defining what ship may operate in the seagoing commerce for merchant profits, then it has followed that articulated ship investors have financially failed despite adequacy of performance. British Patent No. 1,862 issued to Thomas MacSweeny in 1853, but MacSweeny with the *Connector* ship is shown to have followed earlier teaching of this art by Sir Samuel Bentham, a Utilitarian scientist and a Naval Constructor. Vide article by G. Archer, President, Missouri Research, Inc., in World Ports & Marine News, July 1962, pp. 33–4, and August 1962, pp. 45–7. Modern references in this art are: U.S. Patent Nos. 2,715,380 issued Aug. 16, 1955, and 3,035,536 issued May 22, 1962, both to G. Archer, assigned to Missouri Research, Inc. An articulated ship patent issued in the U.S. to Etuso Nakagawa on Aug. 25, 1964, No. 3,145,681 and assigned to Shin-Mitsubishi, Ltd., Tokyo, Japan.

It is within the purview of this invention to increase the radius of the hingle coupling portions to give greater angular bending relationship to the ship segments and extending the arc below the base line of the ship.

The articulated ship monitoring means of this invention comprises means for measuring structural flexing forces and moments acting about three axes each normal to the other and includes a coupling in shell form modified to avoid fouling under flexure. The gauging means includes strain gauges which indicate the source and magnitude of forces tending to twist the gauging means about various axes; those forces tending to bend the gauging means due to attempted rotation of one segment about its longitudinal axis relative to another segment; those forces tending to lift one segment faster than the adjoining segment and those forces caused by a drag of one segment on another segment; those forces tending to bend or shear in the horizontal plane about a vertical axis.

In order to provide clean hull lines and minimum water resistance, pivoting segment couplings have curvatures complementary to adjacent hull lines. Mating segments have substantially mating transverse, interfacing curves whereby no substantial gap exists between coupled segments for entrance of significant amounts of water.

An object of this invention is to provide an insured clearance between two coupled segments in any articulated position. This is accomplished by the use of truncated conically tipped hinge pins and truncated conical hinge pin recesses or bearings. The extended pins may be urged under load as by springs or fluid pressure means rendering them capable of slight forced withdrawal from their bearing seating under excessive loads. A cylindrical portion adjacent the frusto conical tip bears the shear load upon forced withdrawal thus maintaining between the two segments a constant contact and keeping a clearance.

Another object of this invention is a method of converting an empiric ship into an articulated ship of greater capacity, and use of the old ships bilge radius to define the mating coupling curvatures.

These and other objects will become apparent upon a consideration of the following specification taken with the accompanying drawings which together form a complete disclosure of our invention.

In the drawings wherein like parts are represented by like characters of reference:

FIG. 1a is a diagrammatic representation of a conventional monolithic ship showing a line for severing same into two sections;

FIG. 1b shows diagrammatically the conversion of the ship of FIG. 1a into an articulated ship of much greater length;

FIG. 2 is a substantially horizontal section along the line 2—2 of FIG. 1b;

FIG. 3 is a fragmentary vertical section on the line 3—3 of FIG. 2;

FIG. 4 is a fragmentary vertical section on the line 4—4 of FIG. 2;

FIG. 5 is a vertical section on the line 5—5 of FIG. 2;

FIG. 6 is a fragmentary vertical section on the line 6—6 of FIG. 2;

FIG. 7 is an enlarged sectional view showing a portion of FIG. 5;

Figure 8:
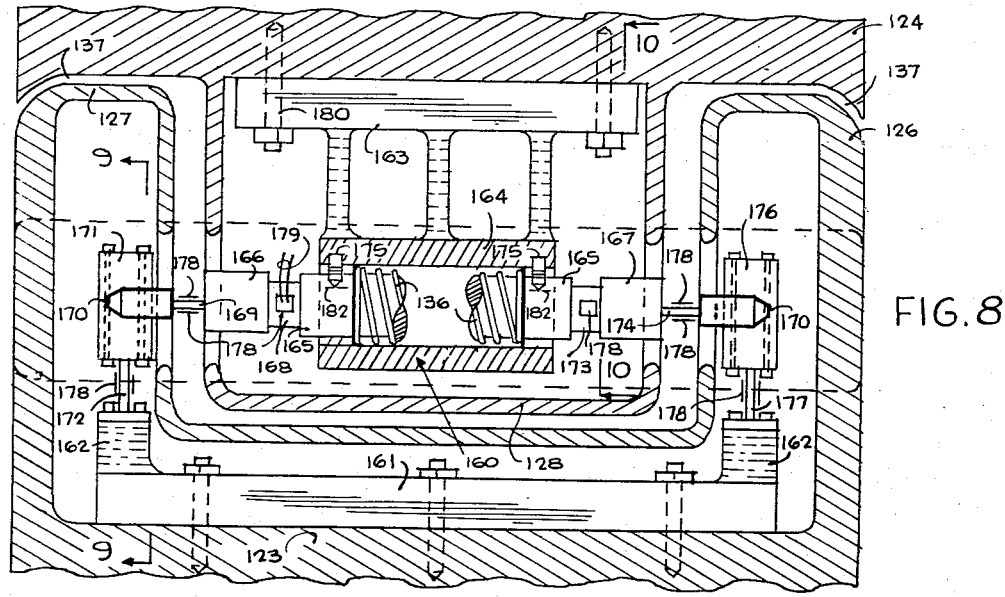
FIG. 8 is a horizontal section through a modified hull and coupling illustrating the application of gauging means substantially as applied to FIG. 2.
Figure 9:
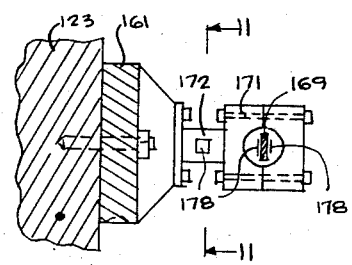
FIG. 9 is a fragmentary section on the line 9—9 of FIG. 8.
Figure 11:
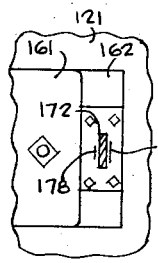
FIG. 11 is a fragmentary section on the line 11—11 of FIG. 9.
Figure 10:
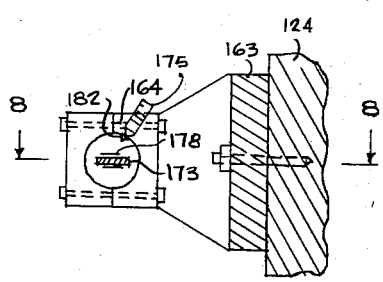
FIG. 10 is a fragmentary section on the line 10—10 of FIG. 8.
Figure 12:
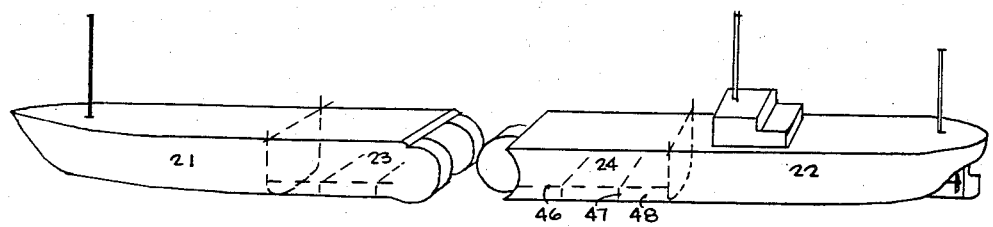
FIG. 12 shows how an empiric ship in two severed parts is each lengthened and ends in a hinge half thus converting it to an articulated ship.

Referring now to the drawings, especially FIGS. 1a to 7, FIG. 1a represents a usual empiric ship with a severance into two parts for a conversion of both parts. The structure 20 in FIG. 1b represents the former conventional empiric ship converted into an articulated ship consisting of, in this case, two segments; segment 22 lengthened by a jumboizing section 24, and segment 21 lengthened by a jumboizing section 23. A bow segment 21 and a stern segment 22 comprise the basic ship. Any suitable number of intermediate segments up to the limit of manageability and safety may be used. Coupling means 25 are used between segments of the ship. Such means comprises a pair of aligned part cylindrical members 26, 27 arranged on an axis transverse to the longitudinal axis of a ship segment at the stern thereof, on all segments except the sternmost segment 22. Members 26 and 27 are arranged respectively at the port and starboard sides of the ship and extend inward transversely of the ship's hull to total approximately half the beam of the ship. On the bow end of any segment, except the bow segment 21, there is a complementary coupling member 28, part cylindrical and of a width substantially equal to the gap between the members 26, 27. The outboard sides of the coupling members 26, 27 are flush with the adjacent sides of the hull of the ship and are substantially perpendicular to the axis of the coupling. The axis of the coupling members 26, 27 and 28 lie at substantially half depth of the ship or about midway between the top deck and the keel. An arc of the couplings' construction may extend beyond or deeper than the base line of either segment to extend limits desired for angular pitching.

In the axis of each of the coupling members 26, 27 and coaxially therewith is an inwardly extending tubular member 29 having a conical outer end 30 adjacent the outboard side 31 of either coupling segment. At either side of the member 28 there is an inwardly extending tubular member 32 in axial alignment with the members 29. A pair of hinge pins 33 each having a portion thereof, by cylindrical form as at 34 and a portion of frusto conical form as at 35 are located in the axis of the coupling and are arranged for projection into and retraction from the tubular members 29, 30, for assembly and disassembly of the coupling 25. The retracting and projecting means is not a part of this invention and any suitable means may be used such as that shown in the aforementioned patent to Gardner Archer, No. 3,035,536. Springs 36 in FIG. 5 indicate one form of applying a useful pressure, and suitable conventional means may be provided for loading the springs 36.

In order to allow for some wear and distortion of the coupling members, a slight clearance 37 is fixed between the stern coupling members 26, 27 and the mating surfaces 38 of the bow segment and a clearance 39 is allowed between the bow coupling element and the mating depression 40 in the stern coupling element. Clearances 41 and 42 also exist between the coupling elements 26 and 27, respectively and the coupling element 28. These clearances fill with water, but the gaps between segments are so small that no turbulence is caused which would affect the operation of the ship.

Bilge radius curve 43 which may be taken from the empiric ship exists between hull sides 31 and the bottom 44. To form coupling interface curves, a continuation of bilge curve 43 is used on coupling elements 26 and 27 and complementary curves 45 are used upon mating elements. Such coupling form obtains cleaner hull lines than previous usage.

Spaced suitably from the bottom within that new constructed portion of articulated ship segments is a false bottom 46 extending the length and breadth of such new construction of the ship segment. Suitable vertical partitions 47 are arranged in spaced relation transversely of the ship segment to provide a plurality of ballast chambers 48. The chambers 48 may be further subdivided in any suitable manner. The ballast chambers may be filled as desired with water or other material by means of suitable pumps, all in conventional manner. The filling of the various ballast chambers within the new added lengths of sections 23 and 24, is to aid in fixing the level and alignment of each segment to couple, uncouple and ride easier regardless of unequal loading and specifically that shear forces acting on the hinge pins 33 are reduced to a minimum.

In order to permit the passage of personnel from one segment to another, a bridge 49 is mounted on the bow end of a segment and comprises an arcuate frame 50 having a suitable floor and pivoted at one end at 51 on a block 52 on the bow of the segment and extends across the gap between segments, having a wheel 53 on its other end that rolls on the stern end of the segment. Such bridge may be readily detachable and may be elevated at its pivoted end to be above a deck load.

In operation, the segments are coupled by means of the hinge pins 33 which are suitably projected from within the coupling member 28 to engagement with the portions 29 and 30 of the tubular pin receiving members. In normal operation the only frictional connection between coupling members 26, 27 and 28 is the pins 33 in their sockets. Firm and constant contact of the frusto conical tip 35 within the conical socket 30 is provided by suitably loading the springs 36 to a predetermined value thereby fixing clearances 37 and 39. In case of shock loading the conical surface of pin 33 senses the extra loading by being the agent in any transfer of forces between the segments. When a set stress limit is reached as determined by the springs 36, the shock load becomes fully a shear stress on the cylindrical portion 34 which is the primary element to transfer or absorb shock and shear loading of the coupling. A slight forced linear retreat of the one pin due to severe shock will cause the gap or clearance 37 to narrow. In the event of accidental damage or distortion of coupling members then the exterior of the coupling can functionally transfer or absorb shock.

By means of a predetermined load line and the readily retracted and projected coupling pins, it is possible to make up a train of articulated barge or ship segments, any one of which may be dropped out at one port or exchanged for another, or the ship may proceed with fewer segments. Preferably the stern segment 22 is the power segment and contains the power plant, propulsion means, fuel supply and crew quarters. The foremost or bow segment 21 may have an auxiliary power plant and bow steering if deemed necessary. Such devices are known in ship construction. Also any intermediate articulated segment may also have auxiliary power plants and other means for ease in maneuverability in port.

The modified form of coupling 25 as shown in FIGS. 8, 9, 10 and 11 contains means for simultaneously monitoring for the source and magnitude of all significant forces and moments acting on the coupling in a ship. Here the members 126 and 127 are provided with space to receive portions of the gauging means 172, 177 which in one respective plane is the only structural support for, and are attached to pivot housing 171, 176 in the stern of a segment. The coupling member 128 contains a portion of the gauging means which is fixed within the coupling axis and to the bow of a segment. Members 126, 127 and 128 correspond to members 26, 27 and 28 heretofore described. The gauging means 160 is fitted within and to the coupling means heretofore described in FIGS. 2, 3, 4, 5, 6, 7, and is semipermanent for prototype employment.

The gauging means 160 comprises an assembled U-shaped member having a base 161 and legs 162; and a T-shaped member having a base 163 and a head 164. The portions 161 and 163 are fastened to the hull portions of the new sections 123 and 124 by suitable bolts as 180. The head 164 is shown as a rectangular housing-journal and slidably contains base ends of the two-part coupling axis 165 and compression springs 136. The axis 165 is milled at either outboard end to form two sections 166 and 167. Section 166 is milled down to a thin portion 168 of predetermined cross section and area as at 168 and spaced therefrom in the direction of the hull to another portion 169, like 168 but in a plane normal thereto. The outer axis end 170 is the pivot point and is clamped within a box 171 built up on the leg 162. Between the box 171 and the base 161 there is a milled section 172 similar to sections 168 and 169 and in a plane normal to the planes of both 168 and 169. In section 167, numerals 173 to 177, inclusive, indicate elements corresponding to elements 168 and 172, respectively, so that describing the elements in section 166 suffices for those corresponding elements in section 167. As stated previously, the retracting and projecting means is not a part of this invention and any suitable means may be used.

On each of the elements 168, 169 and 172 we place a strain gauge 178 of known type, and preferably one on each face of each element. The strain gauges are connected by wires, such as 179 to suitable known electrical indicating and recording instruments all known in the art. Entering housing-journal 164 are threaded pins 175 to fix axis flexure alignment by seating within groove 182 cut in axis 165.

In operation, the element 168 will flex under the influence of forces tending to lift the starboard side of the section 123 relative to the section 124. The same kind of flexing will occur in the element 173 when the port side tends to lift. Conversely, if the section 123 tends to roll to the starboard the flexing will be opposite in the elements 168 and 173. The flexing will be sensed by the strain gauges 178 and duly recorded in terms of force causing such flexing. A tendency of the section 123 to lead at the starboard will cause the element 169 to flex forward in FIG. 8. If the lead is at the port, the section 174 will flex forward. This flexing will be opposite if the section 123 drags. Suitable recording of the flexing sensed by the strain gauges 178 will be translated into an indication of forces causing the flexing. Any tendency for either section 123 or 124, or both, to longitudinal misalignment in the horizontal plane either toward the port or the starboard will be sensed in terms of a flexing of the elements 177 and 172. This flexing will be sensed by the strain gauges 178 and translated into an indication of the forces acting on the coupling members. By use of the above-described gauging means, it is possible to simultaneously measure and record each or all the forces and moments acting on a coupling such as that of FIGS. 1 to 7, in order to control and establish its safety and practicability.

Figure 13:
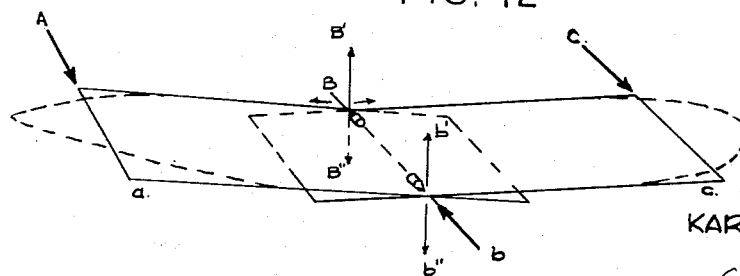
FIG. 13 is a schematic view diagrammatically showing leverage planes of a lateral bending moment with a fulcrum axis escape route.

While it is understood that in a severe seaway large ships obtain yaw and/or side sway, the force to generate such motion in the monolithic ship is expected to produce a modified or altered result when applied to articulated ship segments and focused about a pivot coupling. An articulated ship of two segments is seen in FIG. 13 as two potential first order levers with the outer end of the coupling axis serving as a common fulcrum but the fulcrum being a pivot point, there being two pivot points B and $b$ corresponding to the frusto conical pins 33 each on the end of the transversal axis B, $b$. To survive a severe lateral bending moment, either the coupling must be strong enough to withstand such force as can be generated by one or both lever arms, or the lever may have its effectiveness neutralized or diminished to more manageable limits. Considering the law of the lever, two points are noted; first, the full lever action if obtained is wholly in one plane composed of three points, the power, which is equal to the force of the cresting wave as imposed upon the FIG. 13 segment at A.$a$. and applied to the length A.B. of the segment, the fulcrum $b$, and the centerized weight or resistance of the adjoining coupled segment B.C.$c$.$b$. The effective leverage can only be obtained by its conveyance through the fulcrum pivot point B. or $b$., or an axis formed by pivot points B.$b$. Second, an essential to the law of the lever is a stable fulcrum. But a functional pivot point is either not, or is a very poor fulcrum, since an axis defined by the pivot points may serve as a stable fulcrum only if there is coincidence with the lever plane. In two ship segments that from 180° line there is no leverage. If there is any degree less than 180° then there may be leverage which results in direct compressive stress upon one pivot point as $b$. and tension stress upon the opposite pivot B. A powerful force would then shorten the axis. For one lever to obtain an effectness excluding a foul or frozen coupling, there is one hypothetical plane and one axis which must coincide, i.e., the plane of the lever, and the axis defined by the pivot points. A parallelogram of forces acting on a small body in the orbital motion in a wave shows a substantially greater vertical than lateral leg and normally there is pitching and roll motion associated with a seaway lateral bending moment so the degree of probability of coincidence of the axis and plane is initially remote and/or momentary. But the law of the lever is not fulfilled if the fulcrum does not have stability for loading. Subjected to loading, such a fulcrum can induce or convert a component of the lever force to escape from a full load bearing effectiveness of the lever law. Since either axis or pivot point have a freedom to escape load bearing by moving the full coupling vertically as in pitch, or angularly as in roll, an object of this invention in coupling improvement is to induce and enhance instability of the fulcrum. This is done by sharpening the pivot points and narrowing the plane and by focusing stress loading about the pivot points, i.e., use of truncated cone-tipped pins seated and loaded with an outward controlled pressure. Now the axis and the plane coincidence probabilities have been diminished and the disposition of the fulcrum to instability for leverage has been enhanced.

Having now described our invention in general terms, we desire it to be understood that various changes may be made within the skill of the art and the scope of the appended claims.

We claim:

1. In an articulated ship construction wherein the ship comprises a plurality of segments joined by a substantially horizontal hinge having a portion thereof at the stern of one segment and a portion thereof at the bow of the next adjacent segment interfitting with the other portion the improvement comprising a tubular hinge pin socket at either side of the hinge, said socket having a cylindrical base and a conical outer end, a pair of projectible and retractible hinge pins having cylindrical bodies and frusto conical tips engageable within said sockets, said articulated sections each having a bilge curve as a transition between the bottom and a side of the hull, the ends of said hinge portions on one segment having curves complementary to and representing continuations of the bilge curve of the ship segments, whereby the gap between the segments is substantially closed in all vertical angles of one segment with respect to another adjacent segment.

2. The structure as defined in claim 1 wherein means are provided for applying a predetermined outward thrust to the hinge pins to provide a constant bearing between coupled segments which bearing comprises a frusto conical portion and a cylindrical portion, said conical portion first receiving shock loading, said cylindrical portion providing a predetermined clearance between the coupled segments.

3. The structure as defined in claim 2 wherein the hinge pin loading means comprises compression springs.

4. The structure as defined in claim 1 wherein clearance is provided between the portions of the hinge on the stern of one segment and the bow of the next segment and a clearance is provided between the portion of the hinge on the bow of a segment, and the stern of the next adjacent segment, and including clearance between the respective hinge elements, whereby shock load is first effective on the conical portion of the hinge pin, and under further stress on the cylindrical portion and finally on the hull of the vessel producing a transitional distribution of the shock load.

5. The structure as defined in claim 1, including a floating bridge pivotally anchored at the bow of one segment and having free moving contact with the deck at stern of the next adjacent segment.

6. In an articulated ship having a coupling means for pivotally coupling the stern of one ship segment with the bow of the next adjacent segment, the improvement comprising portions of a hinge on the stern of one segment, and a portion of a hinge on the bow of the adjacent segment, the coupling including gauging means having a part in the stern portion of the hinge and a part in the bow portion of the hinge, said gauging means comprising a U-shaped member having a base affixed to the stern of a segment and having legs extending to the axis of the hinge, a T-shaped member having a base affixed to the bow of a segment and having a head lying in the axis of the hinge, and a bar connecting the ends of the legs of the U-shaped member and the head of the T-shaped member, said bar having portions formed of predetermined cross section and area, and adapted to flex under loads in predetermined directions.

7. The structure as defined in claim 6 in which the portions adapted to flex comprise at least two members adapted to flex under lift or depress conditions and at least two sections, arranged in planes normal to the former, which are adapted to flex under lead or lag conditions.

8. The structure as defined in claim 7 including strain gauges attached to the sections adapted to flex, and having connections to suitable indicating and recording instruments.

9. The structure as defined in claim 7 wherein the bar is torsionally flexed about two axes at right angles to each other; thus providing means to measure moments as well as forces.

10. The structure as defined in claim 7 wherein each of the legs of the U-shaped section is provided with a portion adapted to flex and of predetermined area and cross section which is arranged in a plane normal to the planes of both the aforementioned such portions, and strain gauges affixed to the later mentioned portions, whereby tendency of the hinge to twist, by horizontal angular movement of one ship segment relative to another, may be indicated.

11. In an articulated ship comprising pivotally connected segments each pair of such being connected by a rolling transverse hinge coupling, the provision in each segment of a false bottom to provide a bottom hold, and wherein the bottom hold is subdivided into compartments with provision for differential loading of the compartments in adjacent segments, said different loading providing variations in the draft of one segment relative to another segment permitting substantial alignment of said coupling portions for reducing strain on the hinge coupling.

12. The method of producing an articulated ship of two segments which comprises cutting a monolithic ship into two segments beamwise at its broadest point, adding a lengthening section to each of the resulting ship segments, attaching a portion of a transverse coupling hinge at the end of bow section, attaching a mating coupling hinge member to the end of the stern section and installing a suitable yielding hinge pin to couple the two units for articulated vertical movement, differentially arranging ballast in the ends of the segments adjacent the hinge portions, changing the buoyancy of one segment relative to another to bring the segments into substantially horizontal alignment.

13. An articulated ship comprising the bow portion of an empiric ship having a mating lengthening section formed thereon and a stern portion of an empiric ship having a mating lengthening section formed thereon, said lengthening sections terminating in mating interdigitating members and retractible pin means coupling said interdigitating members for vertical articulation, said lengthening sections each having a false bottom, the space between the false bottom and the bottom of the hulls being subdivided into compartments, means differentially loading such compartments to bring ship segments into substantial horizontal alignment.

References Cited
UNITED STATES PATENTS

| | | | |
|---|---|---|---|
| 427,378 | 5/1890 | Thompson | 182—1 |
| 2,715,380 | 8/1955 | Archer | 114—77 |
| 3,035,536 | 5/1962 | Archer | 114—77 |
| 3,036,539 | 5/1962 | Storey | 114—77 X |
| 3,043,136 | 7/1962 | Cunningham et al. | 73—133 |
| 3,145,681 | 8/1964 | Nakagawa | 114—77 |

MILTON BUCHLER, *Primary Examiner.*

T. M. BLIX, *Assistant Examiner.*